UNITED STATES PATENT OFFICE.

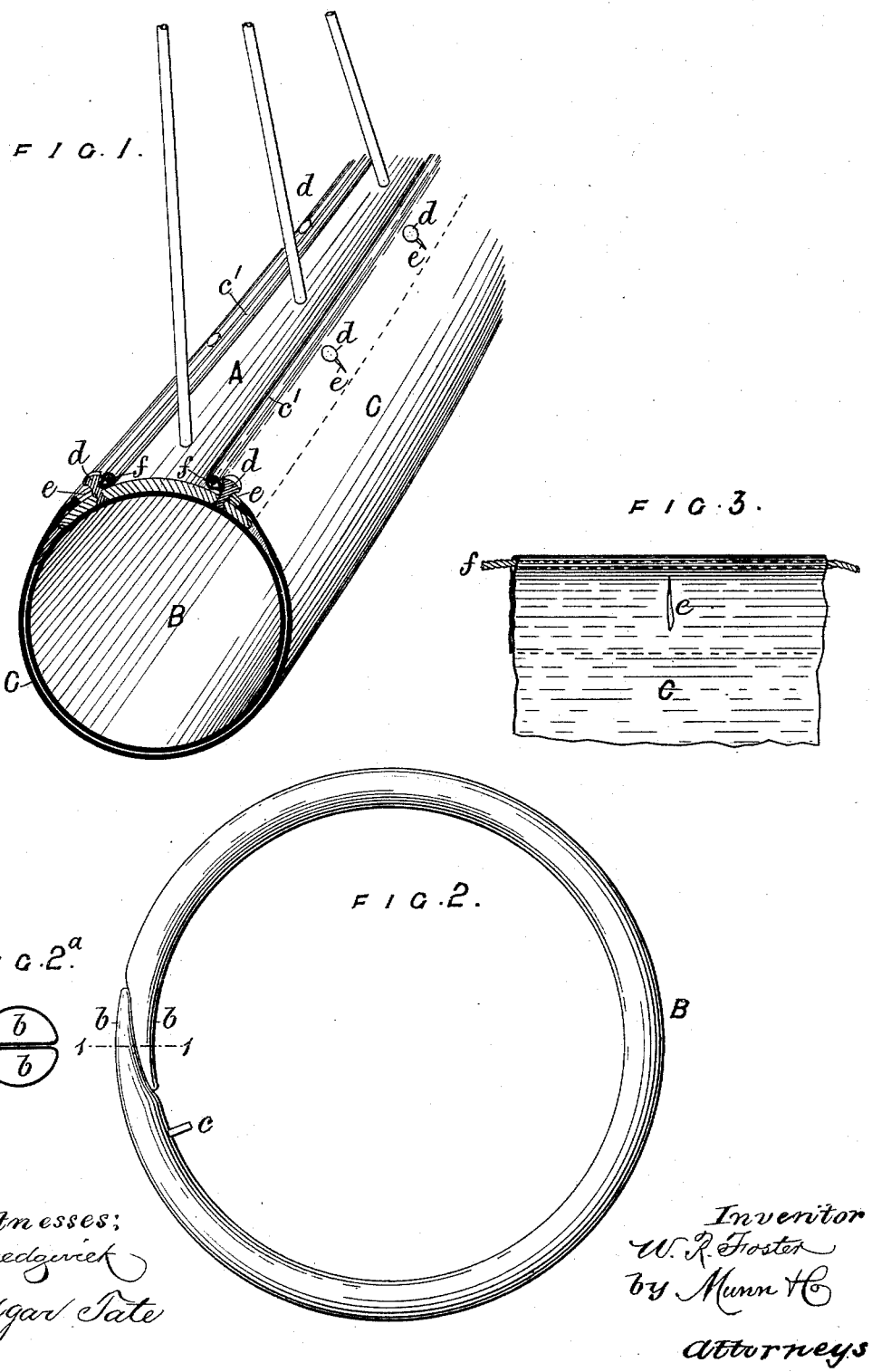

WILLIAM ROBERT FOSTER, OF BERMONDSEY, ENGLAND.

PNEUMATIC TIRE.

SPECIFICATION forming part of Letters Patent No. 468,196, dated February 2, 1892.

Application filed October 15, 1891. Serial No. 408,753. (No model.)

*To all whom it may concern:*

Be it known that I, WILLIAM ROBERT FOSTER, india-rubber manufacturer, of 87 Grange Road, Bermondsey, in the county of Surrey, England, have invented new and useful Improvements in Pneumatic Tires, of which the following is a full, clear, and exact description.

My invention relates to the inflated or "pneumatic" tires of bicycle and other similar wheels, and has for its object to enable the tire to be readily removed and replaced by another in case of injury without entirely removing the cover of the tire from the wheel and without dismounting the wheel from the machine.

The invention consists in the combination, with an inflated tire, (which is not itself a complete annulus, but is a tube adapted to be lapped around the wheel-rim and having closed ends adapted, when the tire is so lapped round the wheel, to make a butt or scarf joint with each other,) of a jacket or cover which is in the form of a complete annulus of tubular cross-section, with a slot or gap extending entirely around the inner circumference of the annulus, the said jacket or cover enveloping both the tire and the side edges of the wheel-rim and being attached to the latter by fastenings which admit of the tire being readily uncovered and replaced by another, this operation, in consequence of the solution of continuity of the tire, being readily performed without dismounting the wheel from its fork.

Reference is to be had to the accompanying drawings, forming part of this specification, wherein—

Figure 1 exhibits a cross-section of the wheel-rim, inflated tire, and cover, seen partly in perspective. Fig. 2 is a side view, on a smaller scale, of the inflated tire, showing the lapped ends. Fig. 2ª is a section on line 1 1, Fig. 2, but drawn to a larger scale. Fig. 3 is an enlarged view of a portion of one edge of the cover, showing the reinforcing rim or bead hereinafter referred to.

The same reference-letters indicate the same parts in all the figures.

A is the usual wheel-rim. B is the inflated tire, which, instead of being in the form of a complete tubular annulus, as usual, is a tube of straight or it may be curved form of a length slightly in excess of the circumference of the wheel-rim, closed at the ends $b\ b$, which are preferably beveled or tapered, as shown in Fig. 2, so that when the tire is lapped around the wheel the ends will make a scarf-joint. The tire is provided with the usual inflation-tube $c$, provided with a valve to prevent the escape of the air. When the tire is thus lapped around the wheel-rim, it is retained in position and protected as far as possible from external injury by a jacket or cover C, made of vulcanized caoutchouc and canvas molded (in the usual way of making such articles) to the form of a complete annulus of nearly tubular form in cross-section, having a slit or gap extending around the entire inner circumference of the annulus to admit of its being sprung over the tire and wheel-rim, as shown in Fig. 1, the edges $c'$ of the jacket or cover embracing the back of the rim and being secured thereto by fastenings which admit of, say, one edge of the jacket being readily unfastened for the purpose of removing the tire and inserting another in its place.

The preferred means of fastening the jacket consists of studs or hooks $d$, riveted or otherwise fixed at intervals to the back of the wheel-rim A and engaged by slots or eyeleted holes $e$ in the jacket, or the studs or hooks might be fixed to the jacket and engage in holes made in the wheel-rim.

In order to strengthen the edges of the jacket and prevent the eyelets or studs tearing out, the edges are beaded or reinforced by the caoutchouc-coated canvas being lapped around a core of wire or cord $f$ and folded upon and cemented to itself, as shown in Fig. 3.

Having now particularly described and ascertained the nature of the said invention and in what manner the same is to be performed, I declare that what I claim is—

1. The combination, with a tubular tire formed with closed ends and adapted to be lapped around the wheel-rim, the ends being beveled or tapered so as to lap over each other and make a scarf-joint, of a jacket or cover in the form of a complete annulus of nearly complete tubular cross-section, but with a slot or gap extending around the inner circumference of the annulus, the said jacket being adapted to envelop the tire and its edges being detachably secured at intervals to the back of the wheel-rim, substantially as and for the purpose specified.

2. The combination, with a tubular tire having closed ends and adapted to be lapped round the wheel-rim, as described, and with an endless jacket or cover of nearly complete tubular cross-section adapted to envelop the tire and rim, as described, of studs or hooks fixed to the wheel-rim, and eyeleted holes or slots in the edges of the jacket, adapted to engage therewith for securing the jacket and tire, as described.

The foregoing specification of my improvement in pneumatic tires signed by me this 28th day of September, 1891.

WILLIAM ROBERT FOSTER.

Witnesses:
T. N. KENNARD,
53 *Chancery Lane, London.*
THOMAS LAKE,
17 *Gracechurch St., London.*